Patented Sept. 25, 1951

2,568,993

UNITED STATES PATENT OFFICE 2,568,993

PURIFICATION OF PARA-CAPROYLAMINO-BENZENESULFONHYDROXAMIDE

Charles M. Eaker, Affton, and Ferdinand B. Zienty, Brentwood, Mo., assignors to Monsanto Chemical Company, St. Louis, Mo., a corporation of Delaware No Drawing. Application February 14, 1949, Serial No. 76,407

5 Claims. (Cl. 260—397.7)

This invention relates to para-caproylaminobenzenesulphonhydroxamide; more particularly this invention relates to an improvement in the process for the purification of crude para-caproylaminobenzenesulphonhydroxamide.

Para - caproylaminobenzenesulphonhydroxamide is a valuable material for the treatment of various bacterial infections. In such applications it is necessary that para-caproylaminobenzenesulphonhydroxamide be of the highest degree of purity. Para-caproylaminobenzenesulphonhydroxamide is generally prepared by the reaction of one mol of para-caproylaminobenzenesulfonyl chloride with about one and one-half mols of hydroxylamine hydrochloride in a pyridine medium. The crude crystals of para-caproylaminobenzenesulphonhydroxamide are filtered from the reaction medium and then recrystallized from a suitable organic solvent such as a mixture of water and alcohol. The thus purified crystals of para-caproylaminobenzenesulphonhydroxamide heretofore have then been air or vacuum dried at elevated temperatures. According to the aforementioned procedure, the recrystallization of para-caproylaminobenzenesulphonhydroxamide results in the formation of exceedingly unstable crystals which decompose during the subsequent drying operation. This decomposition is indicated by the evolution of brown fumes of oxides of nitrogen, a yellow or brown discoloration of the product and a lowering of the melting point of the finished material, thereby producing a material which is of such a low degree of purity that it is not suitable for use in the treatment of bacterial infections.

It is an object of this invention to provide an improved process for the purification of para-caproylaminobenzenesulphonhydroxamide.

It is a further object of this invention to provide an improvement in the process for the purification by recrystallization of para-caproylaminobenzenesulphonhydroxamide whereby the resulting crystals of para-caproylaminobenzenesulphonhydroxamide do not decompose during the final drying operation and possess exceptional purity.

Further objects will become apparent from the description of the novel process of this invention and the claims.

It has now been discovered that para-caproylaminobenzenesulphonhydroxamide crystals which have been recrystallized from a suitable organic solvent will not decompose during the final drying operation, which may be carried out either in air or in vacuum at elevated temperatures, if these crystals have been intimately contacted with a buffer solution having a pH in the range of from about 5.0 to about 9.0 and preferably in the range of from about 6.0 to about 8.0.

The novel process of this invention may be carried out in any manner that will afford an intimate contact between the recrystallized para-caproylaminobenzenesulphonhydroxamide and the buffer solution. However, the preferred and most convenient methods of accomplishing this result are by dissolving and recrystallizing crude para - caproylaminobenzenesulphonhydroxamide in a suitable organic solvent which has been buffered so as to have a pH in the range of about 5.0 to 9.0 and preferably between 6.0 and 8.0, or by merely filtering para-caproylaminobenzenesulphonhydroxamide that has been recrystallized from an organic solvent and washing the crystals with a buffer solution having a pH in the range of about 5.0 to 9.0 and preferably between 6.0 and 8.0. Typical of the organic solvents which may be utilized are ethyl alcohol, methyl alcohol, isopropyl alcohol, acetone and mixtures of these solvents with water. Any of the common buffer systems having a pH in the range specified, which are well known to those skilled in the art, may be utilized. Such buffer systems are exemplified by the following:

Buffer system

| | pH |
|---|---|
| Potassium acid phthalate-sodium hydroxide | 5.0 |
| Secondary sodium citrate | 5.0 |
| Potassium acid phosphate-disodium phosphate | 6.8 |
| Potassium acid phosphate-sodium hydroxide | 6.8 |
| Boric acid-borax | 8.5 |

After washing the recrystallized para-caproylaminobenzenesulphonhydroxamide, the material may then be air or vacuum dried at temperatures in the range of from 30° C. to 100° C. and preferably from 40° C. to 60° C.

This invention may be further illustrated by the following examples:

Example I

Crude crystals of p-caproylaminobenzenesulphonhydroxamide were prepared by the condensation of one mol of p-caproylaminobenzenesulphonyl chloride with one and one-half mols of hydroxylamine hydrochloride in the presence of pyridine. A portion of these crystals was dissolved and recrystallized in a 75% by volume ethyl alcohol solution. In accordance with conventional procedures, the recrystallized material was filtered and washed with two portions of a 50% by volume ethyl alcohol solution followed by washing with two portions of distilled water and dried under vacuum at 50 C.

During drying there was a noticeable evolution of brown fumes of oxides of nitrogen indicating severe decomposition. The dried product was yellow in color. The product had decomposed to such an extent that accurate melting point determinations were impossible, and the material was totally unsuitable for any practical use.

*Example II*

A portion of the crude p-caproylaminobenzene-sulphonhydroxamide crystals prepared in Example I was dissolved and recrystallized in a 75% by volume isopropyl alcohol solution. The recrystallized material was filtered and washed with two portions of a 50% isopropyl alcohol solution followed by washing with two portions of a potassium acid phthalate-sodium hydroxide buffer having a pH of 5.0. The crystals were then dried in air at 70° C. During drying there was no evidence of decomposition and the resultant material was white in color with a melting point of 180° to 182° C.

*Example III*

A portion of the crude p-caproylaminobenzenesulphonhydroxamide crystals prepared in Example I was dissolved and recrystallized in a 75% by volume ethyl alcohol solution. The recrystallized material was filtered and washed with two portions of a 50% ethyl alcohol solution followed by washing with a citric acid-disodium phosphate buffer having a pH of 7.0 which was prepared by dissolving 1.66 g. of citric acid and 11.65 g. of disodium phosphate in 500 g. of water. The crystals were then dried in vacuum at 50° C. During drying there was no evidence of decomposition and the resultant material was white in color with a melting point of 180° to 182° C.

*Example IV*

A portion of the crude p-caproylaminobenzenesulphonhydroxamide crystals prepared in Example I was dissolved and recrystallized in an acetone solution. The recrystallized material was filtered and washed with two portions of acetone followed by washing with a boric acid-borax buffer having a pH of about 8.5. The crystals were then dried in vacuum at 60° C. During drying there was no evidence of decomposition and the resultant material was white in color and comparable in purity to that prepared in Example III.

*Example V*

A portion of the crude p-caproylaminobenzenesulphonhydroxamide crystals prepared in Example I was dissolved and recrystallized in a 75% by volume ethyl alcohol solution. The recrystallized material was filtered and washed with two portions of a 75% ethyl alcohol solution followed by washing with a sodium acetate-acetic acid buffer having a pH of about 8.5 which had been prepared by dissolving 1.2 g. of acetic acid and 14.5 g. of sodium acetate in 500 ml. of water. The crystals were then dried in vacuum at about 50° C. During drying there was no evidence of decomposition and the resultant material was white in color with a melting point of 180° to 182° C.

*Example VI*

A portion of the crude p-caproylaminobenzenesulphonhydroxamide crystals prepared in Example I was dissolved and recrystallized in a 75% by volume ethyl alcohol solution that had been buffered with a standard citric acid-disodium phosphate buffer so as to have a pH of about 7.0. The crystals were filtered, washed twice with water and then dried in vacuum at about 50° C. During drying there was no evidence of decomposition and the resultant material was white in color having a melting point of 180° to 182° C.

What is claimed is:

1. The process for the purification of crude para - caproylaminobenzenesulphonhydroxamide comprising the recrystallization of crude para-caproylaminobenzenesulphonhydroxamide from an inert organic solvent, filtering the recrystallized para-caproylaminobenzenesulphonhydroxamide crystals, washing the crystals with a solution of a buffer in an inert solvent, said solution having a pH in the range of from about 5.0 to about 9.0 and drying the crystals of para-caproylaminobenzenesulphonhydroxamide at a temperature in the range of from about 30° C. to about 100° C.

2. The process for the purification of crude para - caproylaminobenzenesulphonhydroxamide comprising recrystallizing crude para-caproylaminobenzenesulphonhydroxamide from an inert organic solvent which has been buffered so as to have a pH in the range of about 5.0 to 9.0, filtering the recrystallized para-caproylaminobenzenesulphonhydroxamide, washing the filtered para - caproylaminobenzenesulphonhydroxamide with water and drying the crystals of para-caproylaminobenzenesulphonhydroxamide at a temperature in the range of from about 30° C. to about 100° C.

3. In the process for the purification by recrystallization of para-caproylaminobenzenesulphonhydroxamide, the step comprising recrystallizing crude para-caproylaminobenzenesulphonhydroxamide from an inert organic solvent which has been buffered so as to have a pH in the range of about 5.0 to about 9.0.

4. In the process for the purification by recrystallization of para-caproylaminobenzenesulphonhydroxamide, the step comprising recrystallizing crude para-caproylaminobenzenesulphonhydroxamide from an inert organic solvent which has been buffered so as to have a pH in the range of about 6.0 to about 8.0.

5. In the process of drying para-caproylaminobenzenesulphonhydroxamide the step comprising contacting para-caproylaminobenzenesulphonhydroxamide with a solution of a buffer in an inert solvent immediately prior to drying, said buffer solution having a pH in the range of about 5.0 to about 9.0.

CHARLES M. EAKER.
FERDINAND B. ZIENTY.

REFERENCES CITED

The following references are of record in the file of this patent:

UNITED STATES PATENTS

| Number | Name | Date |
|---|---|---|
| 2,097,415 | Kharasch et al. | Oct. 26, 1937 |
| 2,260,632 | Moore et al. | Oct. 28, 1941 |

OTHER REFERENCES

Moore et al.: "J. Am. Chem. Soc.," vol. 62, Aug. 1940, pp. 2097 to 2099.

Kohl et al.: "Proc. Soc. Expt. Biol. and Med.," vol. 44, June 1940, pages 455 to 457.